United States Patent
Iijima (10) Patent No.: US 11,562,369 B2
(45) Date of Patent: Jan. 24, 2023

(54) TERMINAL DEVICE, PRODUCT WARRANTY APPLICATION SYSTEM, WARRANTY APPLICATION VALIDITY CHECKING METHOD, AND WARRANTY APPLICATION VALIDITY CHECKING PROGRAM

(71) Applicant: JVCKENWOOD Corporation, Kanagawa (JP)

(72) Inventor: Rie Iijima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 290 days.

(21) Appl. No.: 16/910,919

(22) Filed: Jun. 24, 2020

(65) Prior Publication Data

US 2020/0320540 A1 Oct. 8, 2020

Related U.S. Application Data (63) Continuation of application No. PCT/JP2018/038352, filed on Oct. 15, 2018.

(30) Foreign Application Priority Data

Dec. 26, 2017 (JP) .............................. JP2017-249360

(51) Int. Cl.
  *G06Q 30/00* (2012.01)
  *H04W 4/80* (2018.01)
  (Continued)

(52) U.S. Cl.
  CPC .......... *G06Q 30/012* (2013.01); *G06F 9/542* (2013.01); *G06T 7/0002* (2013.01); *G06V 20/62* (2022.01);
  (Continued)

(58) Field of Classification Search
  None
  See application file for complete search history.

(56) References Cited

U.S. PATENT DOCUMENTS 8,442,844 B1 * 5/2013 Trandal ................ G06Q 30/012
                                                       705/35
2006/0111924 A1 * 5/2006 Hollich .................. G06Q 90/00
                                                      705/302

(Continued)

FOREIGN PATENT DOCUMENTS

| EP | 2119200 A1 | 11/2009 |
| JP | 2007-257561 A | 10/2007 |
| JP | 2010-523018 A | 7/2010 |

OTHER PUBLICATIONS

Extended European Search Report from EP Application No. 18897796.1 dated Jan. 22, 2021, 11 pages.

(Continued)

*Primary Examiner* — Wen W Huang
(74) *Attorney, Agent, or Firm* — Brundidge & Stanger, P.C.

(57) ABSTRACT

Based on the identification number of completely wireless earphones entered into an input unit, a checking unit of a terminal device checks whether or not conditions regarding an expiration period and the number of times of use for an exchange service for exchanging one of the pair that is not lost with left and right earphones are satisfied. A display control unit causes a display unit to display a message with an instruction to return the earphone that is not lost when the conditions are satisfied.

4 Claims, 6 Drawing Sheets

(51) Int. Cl.
- *G06F 9/54* (2006.01)
- *G06T 7/00* (2017.01)
- *H04R 1/10* (2006.01)
- *H04R 5/033* (2006.01)
- *G06V 20/62* (2022.01)

(52) U.S. Cl.
CPC ........... *H04R 1/1016* (2013.01); *H04R 5/033* (2013.01); *H04W 4/80* (2018.02); *H04R 2420/07* (2013.01)

(56) References Cited

U.S. PATENT DOCUMENTS

| | | | | |
|---|---|---|---|---|
| 2006/0259374 | A1* | 11/2006 | Chen | G06Q 30/0601 705/26.1 |
| 2009/0187433 | A1* | 7/2009 | Nudd | G06Q 40/08 705/4 |
| 2010/0086192 | A1* | 4/2010 | Grigsby | G06Q 30/0641 707/E17.014 |
| 2011/0016008 | A1* | 1/2011 | Maraz | G06Q 20/202 705/302 |
| 2011/0119142 | A1* | 5/2011 | Maraz | G06Q 20/202 705/302 |
| 2012/0239481 | A1 | 9/2012 | Yankovich et al. | |
| 2013/0316649 | A1* | 11/2013 | Newham | H04W 88/04 455/39 |

OTHER PUBLICATIONS

International Preliminary Examination Report on Patentability (I) with Written Opinion of ISA with an English translation from International Application No. PCT/JP2018/038352 dated Jun. 30, 2020, 9 pages.

International Search Report with English translation from International Application No. PCT/JP2018/038352 dated Nov. 13, 2018, 4 pages.

Phone 7, Dec. 1, 2016, iPhone7 OTOKUWAZA Best Selection, Shinyusha Co., Ltd, JP, p. 36. [see attached English translation located p. 4 of IPERP].

Airpods, [online], Apple Japan, Jun. 10, 2017, [retrieval date Oct. 29, 2018], Internet: <URL:https://web.archive.org we/20170610004030/ https://support.apple.com/ja-jp/airpods/repair/service>, non-official translation (AirPods Repair Service Q&A Center) [see attached English translation located p. 4].

* cited by examiner

| PRODUCT STATUS INFORMATION DB ||||
|---|---|---|---|
| MANUFACTUR-ING NUMBER | SALES | DATE OF SALE | NUMBER OF TIMES OF USE OF EXCHANGE WARRANTY |
| 00000001 | SOLD | 20XX/XX/XX | 0 |
| 00000002 | SOLD | 20XX/XX/XX | 0 |
| 00000003 | SOLD | 20XX/XX/XX | 1 |
| 00000004 | SOLD | 20XX/XX/XX | 0 |
| 00000005 | SOLD | 20XX/XX/XX | 0 |
| 00000006 | NOT YET SOLD | | |
| 00000007 | NOT YET SOLD | | |

TERMINAL DEVICE, PRODUCT WARRANTY APPLICATION SYSTEM, WARRANTY APPLICATION VALIDITY CHECKING METHOD, AND WARRANTY APPLICATION VALIDITY CHECKING PROGRAM

CROSS-REFERENCE TO RELATED APPLICATION

This application is a Continuation of International Application No. PCT/JP2018/038352, filed on Oct. 15, 2018, which in turn claims the benefit of Japanese Application No. 2017-249360, filed on Dec. 26, 2017, the disclosures of which Application is incorporated by reference herein.

BACKGROUND OF THE INVENTION

1. Field

The present invention relates to a terminal device, a product warranty system, a warranty application validity checking method, and a warranty application validity checking program for checking the validity of a warranty application for completely wireless earphones.

2. Description of the Related Art

In recent years, wireless earphones/headphones using Bluetooth (registered trademark) have become widely used. In wireless earphones/headphones, cables between the music players (smartphones or dedicated devices) and the earphones/headphones can be omitted, and the troublesomeness caused by the cables can thus be reduced. The fact that major smartphone manufacturers sell models in which earphone jacks are omitted also supports the spread of wireless earphones/headphones.

Furthermore, in recent years, completely wireless earphones (left-right separated type earphones), in which the cable that connects the left and right earphones has been abolished and the left and right earphones are connected wirelessly, have also become widely used (for example, see Patent Document 1). Completely wireless earphones are also called earplug-type earphones and are easily stored just like earplugs. Completely wireless earphones are totally free from the botheration of cables when worn. They are also suitable for use during exercise such as jogging.

[Patent Document 1] JP 2010-523018 (published Japanese translation of PCT international publication for patent application)

In completely wireless earphones, the right earphone and the left earphone are physically separated. Thus, there is a possibility that only one of the pair of earphones gets lost. Some are hesitant to buy completely wireless earphones because of the risk of losing one of a pair of earphones.

SUMMARY OF THE INVENTION

A terminal device according to one embodiment of the present embodiment includes: a display unit that displays an application screen for a warranty service for a pair of completely wireless earphones; an input unit that receives an entry of an identification number of the pair of completely wireless earphones, of which one earphone is lost; a checking unit that checks whether or not conditions regarding an expiration period and the number of times of use for an exchange service for exchanging one of the pair that is not lost with left and right earphones are satisfied based on the identification number of the pair of completely wireless earphones entered into the input unit; and a display control unit that causes the display unit to display a message with an instruction to return the earphone that is not lost when the conditions are satisfied.

Another embodiment of the present embodiment relates to a product warranty application system. This product warranty application system includes: a management unit that manages product information of a pair of completely wireless earphones; and a terminal device capable of accessing the management device via a network. The management device has: a product status information storing unit that stores status information including sales information of the pair of completely wireless earphones and usage information of an exchange service for exchanging one of the pair that is not lost with left and right earphones; a communication unit that receives identification number of the pair of completely wireless earphones, of which one earphone is lost, from the terminal device; and a processing unit that refers to the status information in the product status information storing unit and determines whether or not a product with the received identification number satisfies conditions regarding an expiration period and the number of times of use for the exchange service. The communication unit returns the determination result to the terminal device. The terminal device has: a display unit that displays an application screen for a warranty service for the pair of completely wireless earphones; an input unit that receives an entry of an identification number of the pair of completely wireless earphones, of which one earphone is lost; a communication unit that transmits the identification number of the pair of completely wireless earphones entered into the input unit to the management device and receives a determination result indicating whether or not the conditions regarding the expiration period and the number of times of use for the exchange service are satisfied; and a display control unit that causes the display unit to display a message with an instruction to return the earphone that is not lost when the conditions are satisfied.

Yet another embodiment of the present invention relates to a warranty application validity checking method. This method includes: displaying an application screen for a warranty service for a pair of completely wireless earphones on a display unit; receiving an entry of an identification number of the pair of completely wireless earphones, of which one earphone is lost; checking whether or not conditions regarding an expiration period and the number of times of use for an exchange service for exchanging one of the pair that is not lost with left and right earphones are satisfied based on the entered identification number of the pair of completely wireless earphones; and causing the display unit to display a message with an instruction to return the earphone that is not lost when the conditions are satisfied.

Optional combinations of the aforementioned constituting elements and implementations of embodiments in the form of methods, apparatuses, systems, computer programs, etc., may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

The embodiment of the present invention relates to a warranty service for a pair of completely wireless earphones. A pair of completely wireless earphones are earphones in which a right-ear earphone and a left-ear earphone are separated, and the wiring for connecting the right-ear earphone and the left-ear earphone is omitted. Neither an overhead band nor a neck band for stabilizing the wearing of the left and right earphones on the ears is used.

Figure 1:
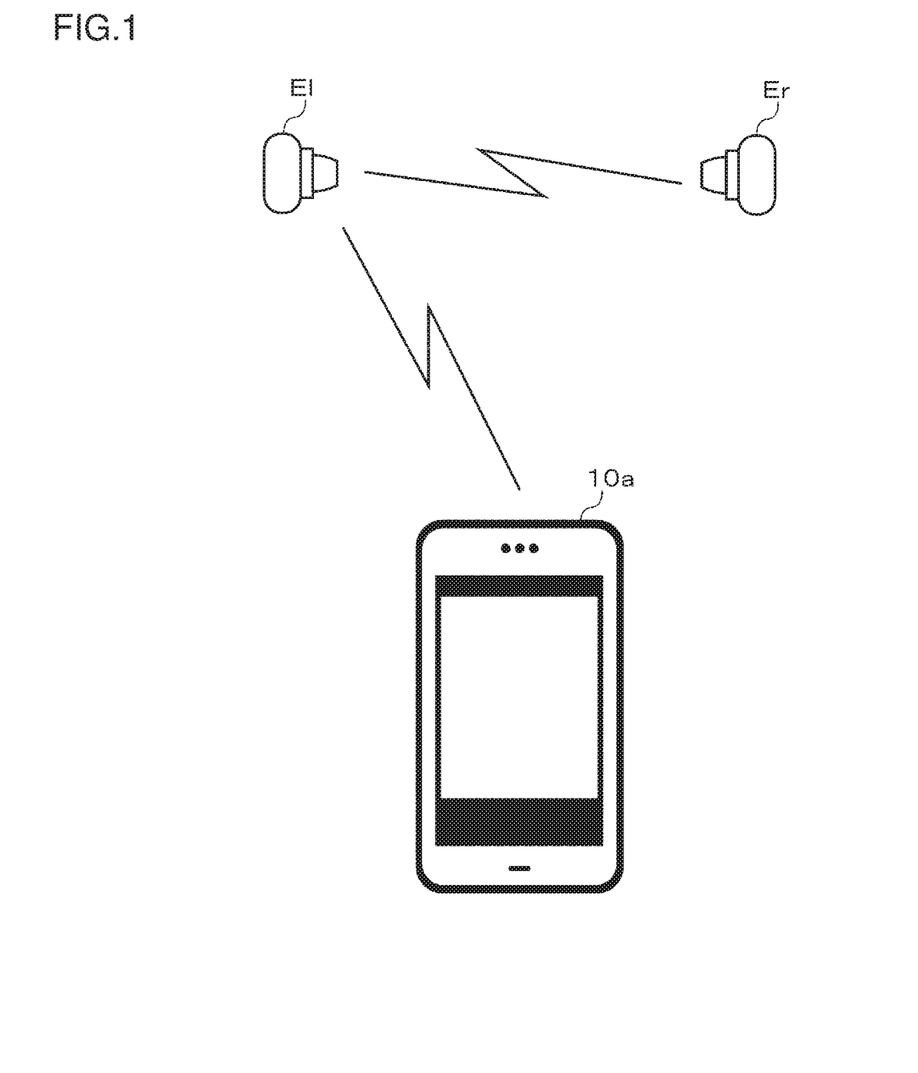
FIG. 1 is a schematic diagram showing a method of connecting a pair of completely wireless earphones and a music reproducing device according to an embodiment of the present invention.

FIG. 1 is a schematic diagram showing a method of connecting a pair of completely wireless earphones and a music reproducing device according to an embodiment of the present invention. The pair of completely wireless earphones include a right-ear earphone Er and a left-ear earphone El. In the present specification, a device having a function of converting an electric signal into air vibrations is called an earphone regardless of the structure, size, and wearing type of an ear wearing part. The structure of the earphone housing may be a closed type, an open type, or a bone conduction type. The wearing type may be an inner ear type, a canal type, or an ear-hook type.

A smartphone or a dedicated device can be used as the music reproducing device 10a. FIG. 1 illustrates an example where a smartphone is used. The wireless earphones are connected to the music reproducing device 10a by short-range wireless communication (in the present specification, Bluetooth (registered trademark) is assumed). Further, in the pair of completely wireless earphones, the right-ear earphone Er and the left-ear earphone El are also connected through short-range wireless communication.

When using Bluetooth (registered trademark), it is necessary to perform pairing connection between devices that perform wireless communication. In the example shown in FIG. 1, the music reproducing device 10a and the left-ear earphone El are paired and connected. This pairing setting needs to be performed by the user, and the same applies to a normal wireless earphone in which the left and right earphones are not separated and to completely wireless earphones.

The pairing connection between the right-ear earphone Er and the left-ear earphone El is preset by the manufacturer, and the user does not need to perform the pairing setting of the right-ear earphone Er and the left-ear earphone El before starting the use. In this case, the user can start using the completely wireless earphones by simply performing the same initial setting as that for a normal wireless earphone.

In the present embodiment, a specification is employed where the user cannot set/cancel the pairing between the right-ear earphone Er and the left-ear earphone El. As a result, a setting screen that is the same as that for a normal wireless earphone can be displayed, allowing the user's operation to be simple. The operation for the pairing of the right-ear earphone Er and the left-ear earphone El is easier compared to a product with a specification where the user can customize the pairing.

FIG. 1 shows a structure where the music reproducing device 10a and the left-ear earphone El are paired and connected, where the left-ear earphone El and the right-ear earphone Er are paired and connected, and where the right-ear earphone Er receives audio data for the right ear from the music reproducing device 10a via the left-ear earphone El. Concerning this point, a structure may be employed where the music reproducing device 10a and the right-ear earphone Er are paired and connected, where the right-ear earphone Er and the left-ear earphone El are paired and connected, and where the left-ear earphone El receives audio data for the left ear from the music reproducing device 10a via the right-ear earphone Er.

Figure 2:
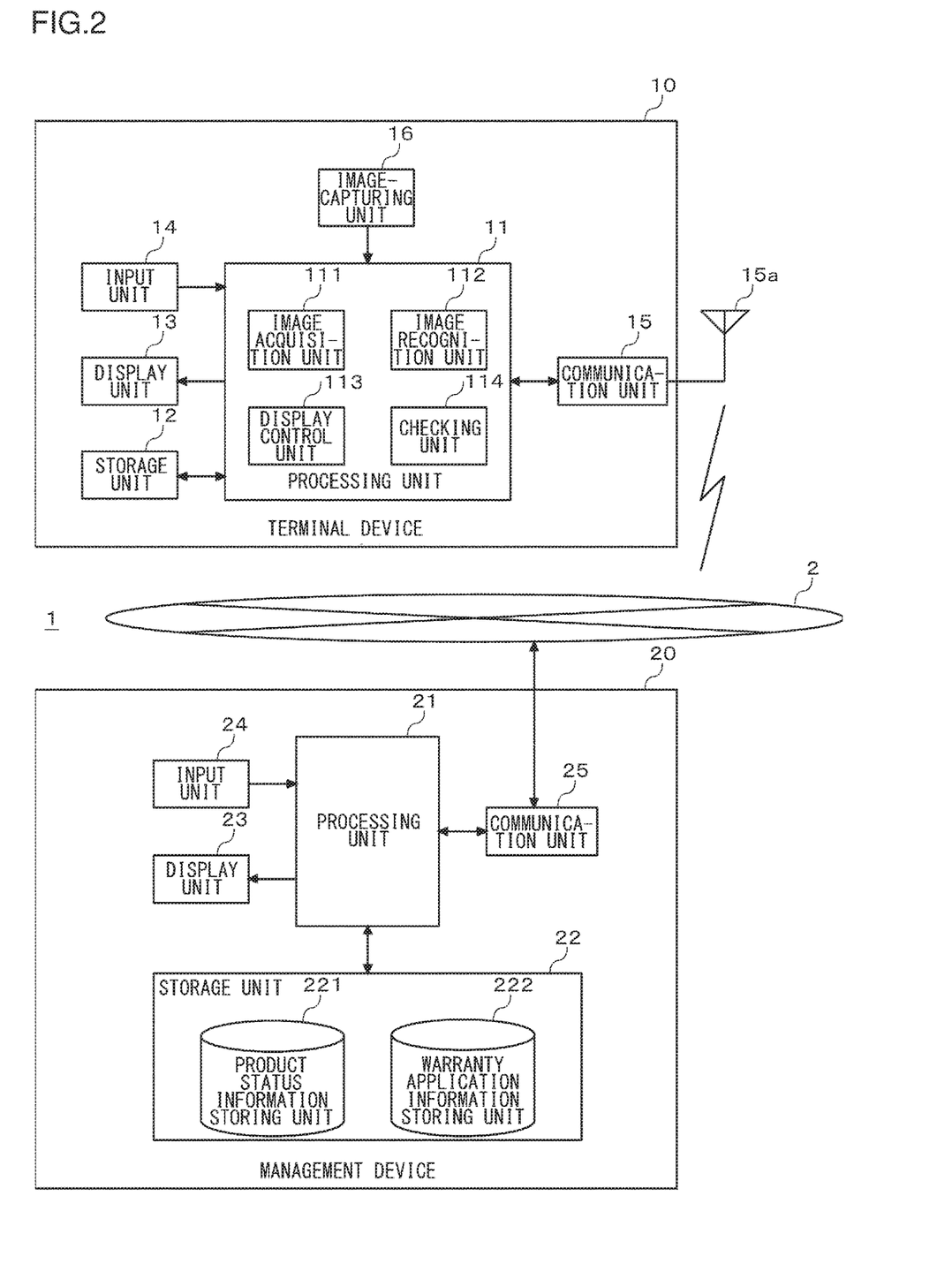
FIG. 2 is a diagram showing a configuration example of a product warranty application system according to the embodiment of the present invention.

FIG. 2 is a diagram showing a configuration example of a product warranty application system 1 according to the embodiment of the present invention. The product warranty application system 1 includes a terminal device 10 and a management device 20. The terminal device 10 is a terminal device that can be used by a user of completely wireless earphones. The terminal device 10 needs to have a function of connecting to a network 2 (in the present specification, the Internet is assumed). For example, a smartphone, a feature phone, a PC, a tablet, etc., fall into this. The terminal device 10 shown in FIG. 2 and the music reproducing device 10a shown in FIG. 1 may be the same devices or different devices. In the following explanation, an example is assumed where the music reproducing device 10a and the terminal device 10 are the same smartphones.

The management device 20 is installed in a customer support center of the manufacturer of the completely wireless earphones, a data center contracted with the manufacturer, or the like. The management device 20 is normally composed of a plurality of servers. The management device 20 needs to be connected to the network 2.

The terminal device 10 includes a processing unit 11, a storage unit 12, a display unit 13, an input unit 14, a communication unit 15, and an image-capturing unit 16. The processing unit 11 includes an image acquisition unit 111, an image recognition unit 112, a display control unit 113, and a checking unit 114. The function of the processing unit 11 can be realized by cooperation of hardware resources and software resources, or only by hardware resources. CPUs, GPUs, DSPs, FPGAs, ROMs, RAMs, and other LSIs can be used as the hardware resources. Programs such as operating systems and applications can be used as the software resources. The storage unit includes a non-volatile memory. A NAND-type flash memory or the like can be used as the non-volatile memory.

The display unit 13 includes a display such as a liquid crystal display or an organic EL display, and displays an image generated by the processing unit 11. The input unit 14 includes a user interface such as a physical key and a touch panel. The display unit 13 and the input unit 14 may be formed by an integrated touch panel display.

The communication unit 15 performs a signal process for wireless communication via an antenna 15a. The communication unit 15 performs a signal process for short-range wireless communication with a Bluetooth (registered trademark) compliant device (left-ear earphone El in the present embodiment), a signal process for wireless communication with a mobile phone base station, and a signal process for wireless communication with a LAN access point. The terminal device 10 can be connected to the network 2 via a mobile phone base station or a wireless LAN access point.

The image-capturing unit 16 is provided with a solid-state imaging device (for example, CMOS image sensor and CCD image sensor) and a signal processing circuit. The solid-state imaging device converts incident light into an electrical signal, and the signal processing circuit performs a signal process such as A/D conversion, noise removal, and the like on image data photoelectric-converted by the solid-state imaging device and outputs the resulting image data to the processing unit 11.

The management device 20 includes a processing unit 21, a storage unit 22, a display unit 23, an input unit 24, and a communication unit 25. The storage unit 22 includes a product status information storing unit 221 and a warranty application information storing unit 222. The processing unit 21 can be realized by the cooperation of hardware resources and software resources or only by hardware resources. CPUs, GPUs, DSPs, FPGAs, ROMs, RAMs, and other LSIs can be used as the hardware resources. Programs such as operating systems and applications can be used as the software resources. The storage unit 22 includes a non-volatile memory. HDD or SSD can be used as the non-volatile memory.

The display unit 23 includes a display such as a liquid crystal display or an organic EL display, and displays an image generated by the processing unit 21. The input unit 24 is a user interface such as a keyboard, a mouse, or a touch panel. The communication unit 25 is a communication interface for connecting to the network 2. For example, the communication unit 25 executes a communication process that complies with Ethernet (registered trademark) and TCP/IP.

Figure 3:
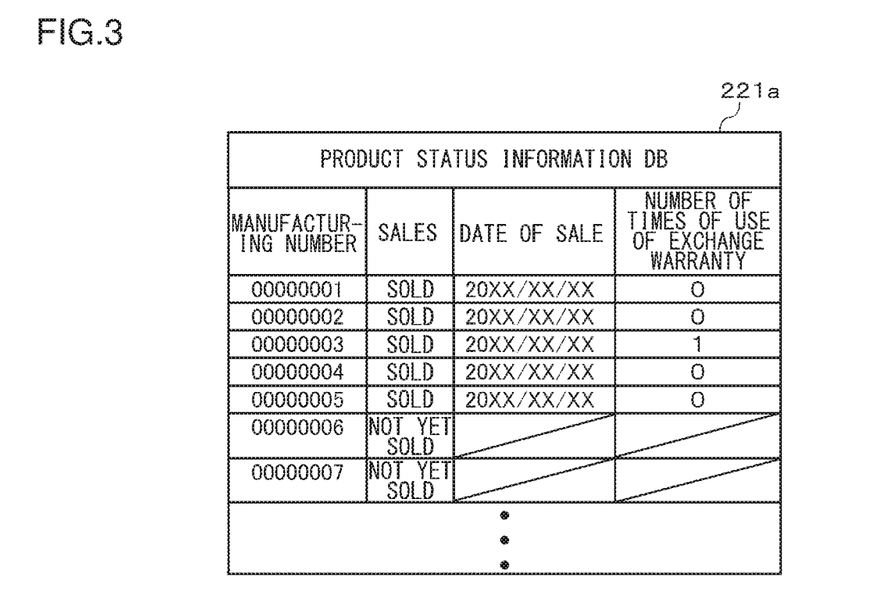
FIG. 3 is a diagram showing an example of a product status information database built in a product status information storing unit.

FIG. 3 is a diagram showing an example of a product status information database 221a built in a product status information storing unit 221. A product managed by the product status information database 221a is a pair of completely wireless earphones of a specific model. A manufactured product is given a manufacturing number for uniquely identifying the product. For example, a serial number can be used as the manufacturing number.

In the product status information database 221a shown in FIG. 3, whether the product has been sold or not, the date of sale, and the number of times of use of the exchange warranty are managed for each individual product. Regarding whether the product has been sold or not, "not yet sold" is set at the time of the manufacturing and is changed to "sold" when a notification indicating the completion of the sales is received from a retail store (including an EC site). For the date of sale, data of the date on which the product is sold at a retail store is set. For the number of times of use of the exchange warranty, the number of times the purchaser used exchange warranty service for losing one of the pair of earphones is set. The initial value is set to 0, and the value is incremented each time the exchange warranty service is used.

In the present embodiment, breakdown, damage, and loss of one of a pair of earphones are set as warranty service items for a pair of completely wireless earphones. In the present embodiment, the loss of one of the pair of earphones is focused out of these warranty items. The loss of one of a pair of earphones means to lose one of the right-ear earphone Er and the left-ear earphone El. The loss of one of a pair of earphones in the present specification is a concept including the case where one of the right-ear earphone Er and the left-ear earphone El is stolen. The loss of one of a pair of earphones is a problem specific to a pair of completely wireless earphones.

In the present embodiment, as a warranty service for the loss of one of a pair of earphones, a service for providing, for replacement, a new pair of completely wireless earphones that includes a right-ear earphone Er and a left-ear earphone El limited only one time within a year from the purchase as long as the remaining earphone is returned. When the limit for the number of times the exchange warranty service is used for the loss of one of the pair of earphones is one, the number of times of use of the exchange warranty in the product status information database 221a can be specified by a flag.

In addition to the items shown in FIG. 3, the items in the product status information database 221a may include user registration information, vendor information, information regarding whether the earphones have been repaired or exchanged by using a warranty service for breakdown and damage, etc.

Figure 4:
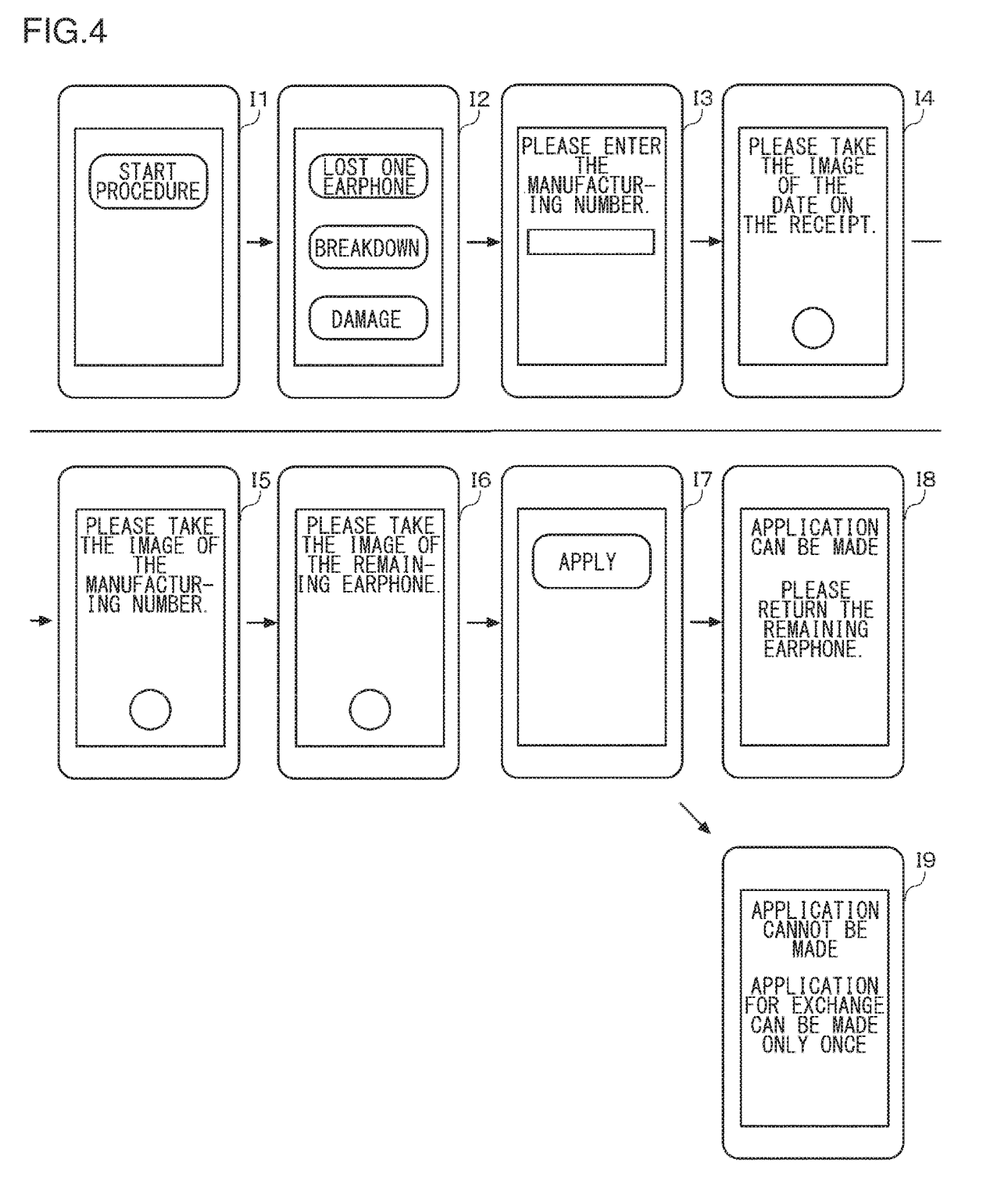
FIG. 4 is a diagram showing a screen transition example when using a warranty application validity checking process using a terminal device and a management device according to the embodiment of the present invention.

FIG. 4 is a diagram showing a screen transition example when using a warranty application validity checking process using the terminal device 10 and the management device 20 according to the embodiment of the present invention. When the user operates the input unit 14 of the terminal device 10 to transit to a web page or start an application for checking the application of the warranty service of the completely wireless earphones, the display control unit 113 displays a "start procedure" button for the warranty service for the pair of completely wireless earphones on a screen of the display unit 13 (see I1). When the user operates the input unit 14 and selects the "start procedure" button, the display control unit 113 displays application items for the warranty service on the screen of the display unit 13 (see I2). In an example shown in FIG. 4, "lost one earphone", "breakdown", and "damage" are displayed as application items.

When the user operates the input unit 14 and selects "lost one earphone", the display control unit 113 displays a message stating "Please enter the manufacturing number" and an entry field for the manufacturing number on the screen of the display unit 13 (see I3). When the user operates the input unit 14 to enter the manufacturing number of the pair of completely wireless earphones of which one earphone is lost, the checking unit 114 acquires the entered manufacturing number.

The checking unit 114 outputs the manufacturing number to the communication unit 15 so as to cause the manufacturing number to the management device 20 via the network 2. The communication unit 25 of the management device 20 receives the manufacturing number transmitted via the network 2 and outputs the manufacturing number to the processing unit 21. The processing unit 21 refers to the product status information storing unit 221 and determines whether or not the product with the received manufacturing number satisfies the conditions regarding the expiration period and the number of times of use for the exchange warranty service for losing one of the pair of earphones.

In the present embodiment, if the date of purchase of the product with the received manufacturing number is within one year and the number of times the exchange warranty service has been used is 0, it is determined that application for the exchange can be made. If at least one of the conditions is not satisfied, it is determined that application for the exchange cannot be made. If the sale date data of the product with the manufacturing number is not stored in the product status information storing unit 221, it is provisionally determined that the condition for the expiration period is satisfied. The processing unit 21 outputs the determination result to the communication unit 15 so as to cause the determination result to the terminal device 10 via the network 2. The communication unit 15 of the terminal device 10 receives the determination result transmitted via the network 2 and outputs the determination result to the checking unit 114.

The checking unit 114 activates the image-capturing unit 16 when the determination result indicates that the application can be made. The display control unit 113 displays a preview image captured by the image-capturing unit 16, a shutter button, and a message stating "Please take the image of the date on the receipt" on the screen of the display unit 13 (see I4). The receipt is an example of a document in which the date of purchase is written and may be a document such as a purchase certificate, a cover letter, or a warranty card on which the date of purchase is filled in at a retail store.

When the user presses the shutter button to capture the image of the receipt, the image acquisition unit 111 acquires, from the image-capturing unit 16, an image file of the captured image of the receipt. When the image file is acquired, the display control unit 113 displays a preview image captured by the image-capturing unit 16, a shutter button, and a message stating "Please take the image of the manufacturing number" on the screen of the display unit 13 (see I5). The manufacturing number may be stamped on the product, printed on the box the product was in, or printed on the warranty card attached to the product.

When the user presses the shutter button to capture the image of the manufacturing number, the image acquisition unit 111 acquires, from the image-capturing unit 16, an image file of the captured image of the manufacturing number. When the image file is acquired, the display control unit 113 displays a preview image captured by the image-capturing unit 16, a shutter button, and a message stating "Please take the image of the remaining earphone" on the screen of the display unit 13 (see I6).

When the user presses the shutter button to capture the image of the earphone that is left on the user's side, the image acquisition unit 111 acquires, from the image-capturing unit 16, an image file of the captured image of the earphone. The image of the earphone may be captured using a moving image. When the image file is acquired, the display control unit 113 displays an "Apply" button on the screen of the display unit 13 (see I7).

When the user operates the input unit 14 so as to press the "Apply" button, the image recognition unit 112 analyzes the respective images of the acquired image files so as to identify, in the images, the date of purchase, the manufacturing number, one of the pair of earphones that is of the same model as that of the pair of completely wireless earphones covered by the warranty. The image recognition unit 112 identifies each target in the images based on learning model data on each of the date of purchase, the manufacturing number, and the earphone. As an image recognition algorithm, an existing commonly-used algorithm can be used. The image recognition unit 112 outputs to the checking unit 114 whether or not the date of purchase, the manufacturing number, and one of the pair of earphones that is of a model covered by the warranty identified in the image have been detected.

The checking unit 114 determines that the application for the exchange warranty service is valid when, for the identification number entered into the input unit 14, the conditions regarding the expiration period and the number of times of use for the exchange warranty service are satisfied and when the earphone identified in an image is of the same model as that of the pair of completely wireless earphones covered by the warranty, the date of purchase identified in an image is within the expiration period of the exchange warranty service, and the manufacturing number identified in an image matches the manufacturing number entered in the input unit 14. If any one of the above conditions is unsatisfied, the checking unit determines that the application for the exchange warranty service cannot be made.

When the checking unit 114 determines that the application for the exchange warranty service is valid, the display control unit 113 displays a message stating "Application can be made" and a message stating "Please return the remaining earphone" on the screen of the display unit 13 (see I8). The checking unit 114 outputs the respective image files of the date of purchase, the manufacturing number, and one of the pair of earphones to the communication unit 15 so as to cause the image files to be transmitted to the terminal device 10. The communication unit 25 of the management device 20 receives the image files transmitted via the network 2 and outputs the image file to the processing unit 21. The processing unit 21 associates the received image files with the manufacturing number and saves the image file in the warranty application information storing unit 222.

When the checking unit 114 determines that the application for the exchange warranty service cannot be made, the display control unit 113 displays a message stating "Application cannot be made" and a message stating the reason why the application cannot be made on the screen of the display unit 13 (see I9). In the example shown in FIG. 4, as the reason why the application cannot be made, it is shown that the exchange warranty service for the loss of one of the pair of earphones has already been used once and that the application is the second time application.

When the application can be made, the user sends one of the pair of earphones that is left on the user side to the manufacturer's support center. A mechanism may be employed where the user brings one of the pair of earphones that is left on the user side to a retail store so as to send the earphone to the maker's support center via the retail store. Upon receiving one of the pair of earphones, the support center sends the user a pair of completely wireless earphones that include both the left and right earphones.

Figure 5:
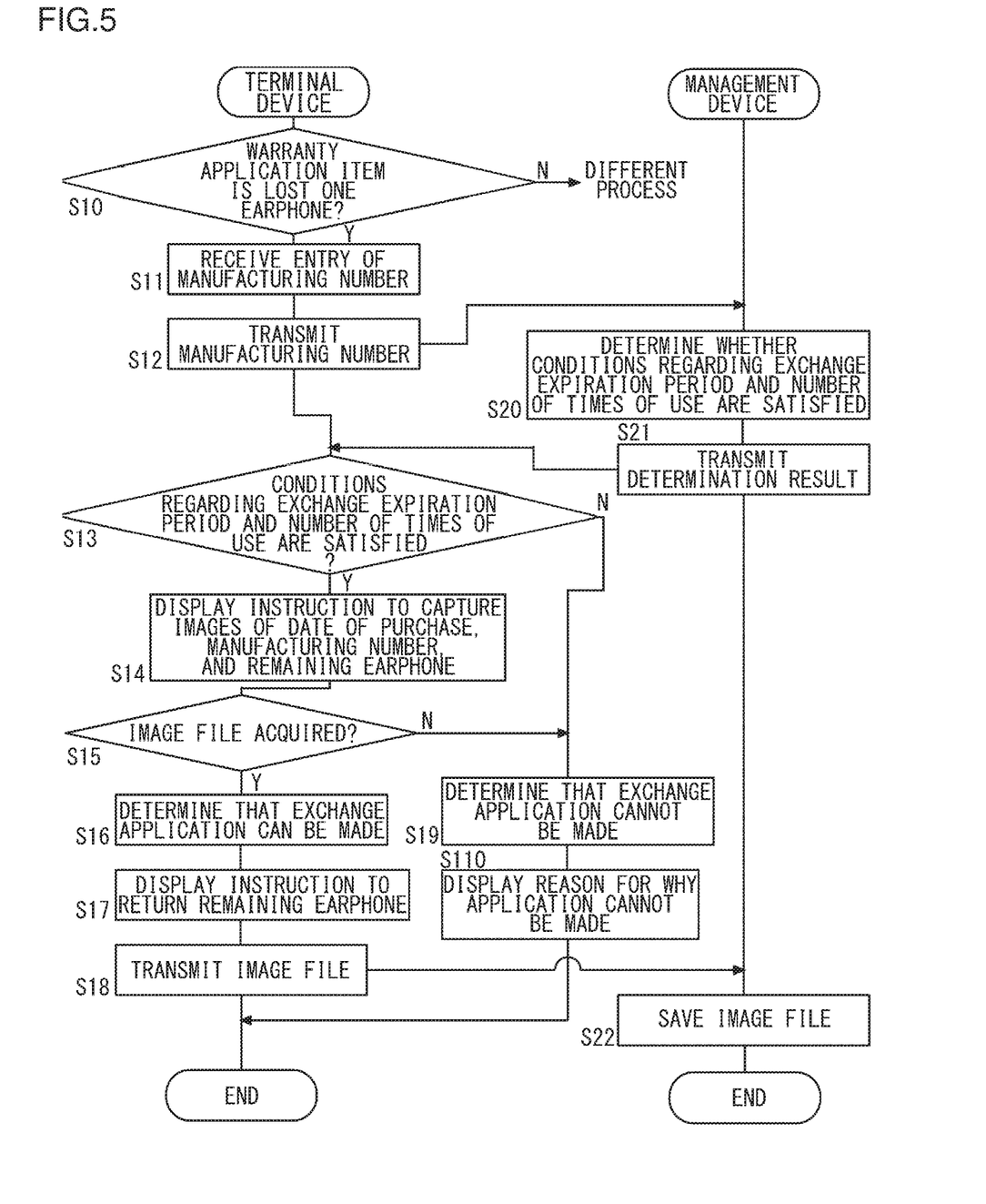
FIG. 5 is a flowchart showing an operation example 1 of the warranty application validity checking process using the terminal device and the management device according to the embodiment of the present invention.

FIG. 5 is a flowchart showing an operation example 1 of the warranty application validity checking process using the terminal device 10 and the management device 20 according to the embodiment of the present invention. The operation example 1 is an example in which the above-mentioned image identification process is not performed and only the attachment of an image file is checked. In the operation example 1, the image recognition unit 112 of the terminal device 10 in FIG. 2 can be omitted.

The display control unit 113 displays the screen for the warranty application service for the completely wireless earphones. When the user selects "lost one earphone" as an application item (Y in S10), the display control unit 113 displays an instruction to enter the manufacturing number on the screen, and when the user enters the manufacturing number, the input unit 14 receives the entry of the manufacturing number (S11). The input unit 14 outputs the received manufacturing number to the checking unit 114. When the application item selected by the user is other than "lost one earphone" (N in S10), the process transitions to another process; however, this is not to be explained in the present specification.

The communication unit 15 transmits the entered manufacturing number to the management device 20 via the network 2 (S12). The communication unit 25 of the management device 20 receives the manufacturing number transmitted via the network 2 and outputs the manufacturing number to the processing unit 21. The processing unit 21 refers to the product status information storing unit 221 and determines whether or not the product with the received manufacturing number satisfies the conditions regarding the expiration period and the number of times of use for the exchange warranty service for losing one of the pair of earphones (S20). The communication unit 25 transmits the determination result to the terminal device 10 via the network 2 (S21).

The communication unit 15 of the terminal device 10 receives the determination result transmitted via the network 2 and outputs the determination result to the checking unit 114. When the determination result satisfies the conditions regarding the expiration period and the number of times of use for the exchange warranty service for the loss of one of the pair of earphones (Y of S13), the display control unit 113 displays an instruction to capture the respective images of the date of purchase, the manufacturing number, and the remaining earphone on the screen (S14).

When the image acquisition unit 111 acquires the respective image files of the date of purchase, the manufacturing number, and the remaining earphone (Y in S15), the checking unit 114 determines that the exchange warranty application is valid (S16). The display control unit 113 displays an instruction to return the remaining earphone on the screen (S17). The communication unit 15 transmits the acquired image files to the management device 20 via the network 2 (S18). The communication unit 25 of the management device 20 receives the image files transmitted via the network 2 and outputs the image files to the processing unit 21. The processing unit 21 saves the received image files in the warranty application information storing unit 222 (S22).

In step S13, when the determination result received from the management device 20 does not satisfy the conditions regarding the expiration period and the number of times of use for the exchange warranty service for the loss of one of the pair of earphones (N of S13), the checking unit 114 determines that the exchange warranty application cannot be made (S19). The display control unit 113 displays the reason for why the application cannot be made on the screen (S110). In this case, the reason for why the application cannot be made is any one of the expiration of the warranty period, the exceeding of the number of times of use, an invalid manufacturing number. When the reason is due to the wrong entry of an invalid manufacturing number, the correct manufacturing number is entered so as to redo the warranty application validity checking process.

In step S15, when the image acquisition unit 111 cannot acquire the respective image files of the date of purchase, the manufacturing number, and the remaining earphone (N in S15), the checking unit 114 also determines that the exchange warranty application cannot be made (S19). The display control unit 113 displays the reason for why the application cannot be made on the screen (S110). The reason for why the application cannot be made in this case is the nonattachment of the image file.

Figure 6:
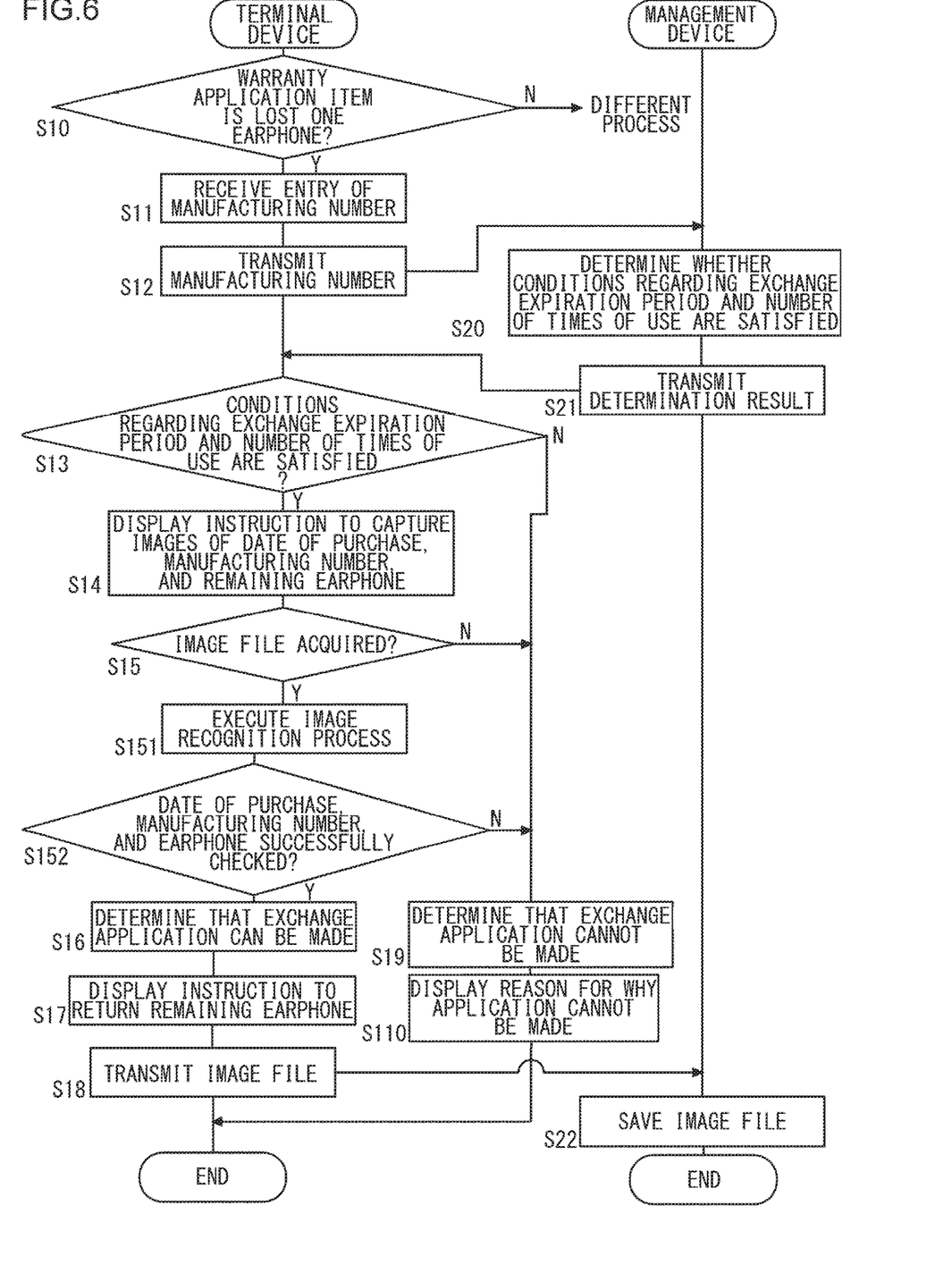
FIG. 6 is a flowchart showing an operation example 2 of the warranty application validity checking process using the terminal device and the management device according to the embodiment of the present invention.

FIG. 6 is a flowchart showing an operation example 2 of the warranty application validity checking process using the terminal device 10 and the management device 20 according to the embodiment of the present invention. The operation example 2 is an example in which the above-described image identification process is also performed. The difference from the operation example 1 will be described in the following.

The processes from step S10 to step S15 are the same as those in the flowchart in FIG. 5. When the image acquisition unit 111 acquires the respective image files of the date of purchase, the manufacturing number, and the remaining earphone (Y in S15), the image recognition unit 112 performs an image identification process on the images for the date of purchase, the manufacturing number, and one of the pair of earphones (S151).

The checking unit 114 determines that the exchange warranty application is valid (S16) when the date of purchase identified in an image is within the expiration period of the exchange warranty service, the manufacturing number identified in an image matches the manufacturing number entered into the input unit 14, and the earphone identified in an image is of the same model as that of the pair of completely wireless earphones covered by the warranty (Y in S152). The processes in steps S17, S18, and S22 are the same as those in the flowchart in FIG. 5.

The checking unit 114 determined that the exchange warranty application cannot be made (S19) when at least one of failure in the image identification of the date of purchase, the date of purchase identified in the image falling outside of the expiration period of the exchange warranty service period, failure in the image identification of the manufacturing number, mismatching of the manufacturing number identified in an image and the manufacturing number entered into the input unit 14, and failure in the image identification of one of the pair of earphones of a model covered by the warranty is occurring (N in S152). The display control unit 113 displays the reason for why the application cannot be made on the screen (S110).

As described above, according to the present embodiment, by introducing the exchange warranty service for a pair of completely wireless earphones including both sides of earphones when one of a pair of completely wireless earphones is lost, a sense of security can be provided for the purchase of completely wireless earphones. Further, when the user loses one of the pair of earphones, the user can use the terminal device 10 to easily learn whether the earphone is covered by the exchange warranty service and the procedure to take when the earphone is covered by the exchange warranty service.

Also, by making it mandatory to return the remaining earphone, it is possible to suppress excessive warranty application from the users. By imposing the returning work on the user, hurdles for false application can be raised. In addition, it is possible to prevent at least a situation where the user obtains two sets of completely wireless earphones each including left and right earphones. Even if the false application for the loss of the left-ear earphone El is made and the right-ear earphone Er is returned, the remaining left-ear earphone El can be only used as a monaural earphone. In the present embodiment, since the manufacturer sets the pairing connection of the right-ear earphone Er and the left-ear earphone El, a method where only an earphone for the lost side is sent to the user from the manufacturer is not adopted.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

In the above embodiment, an example has been described in which a smartphone is used as the terminal device 10. In this respect, when a PC without an image-capturing unit 16 is used as the terminal device 10, it is necessary to connect the PC to a smartphone or a digital camera through wire or wirelessly and load the image file of an image captured by the smartphone or the digital camera into the PC.

In addition, in the above explanation of FIG. 4, an example has been explained in which the respective pictures of the date of purchase, the manufacturing number, and one of the pair of earphones that is left are separately captured so as to acquire three image files thereof. In this respect, a picture in which the date of purchase, the manufacturing number, and one of the pair of earphones that is left are all included in the angle of view may be captured so as to acquire one image file. Alternatively, a picture in which the date of purchase and the manufacturing number are included in the angle of view and a picture of the one of the pair of earphones that is left may be captures so as to acquire two image files.

Further, in the operation example 2, instead of transmitting the manufacturing number entered into the input unit 14 to the management device 20, the manufacturing number identified in an image by the image recognition unit 112 may be transmitted to the management device 20. In this case, the user's operation of entering the manufacturing number to the input unit 14 can be omitted.

Further, in the operation example 2, the image identification process for the captured image may be performed on the management device 20 side. In that case, the image recognition unit 112 in FIG. 2 is provided not on the terminal device 10 side but on the management device 20 side. The process in step S151 in FIG. 6 is executed by the management device 20, and the result of the image identification process is transmitted from the management device 20 to the terminal device 10.

Further, in the above-described embodiment, when a mechanism is established in which sales information of a retail store is accurately reflected in the product status information storing unit 221 of the management device 20, the attachment of the image file of the image of the manufacturing number and/or the image file of the image of the date of purchase may be omitted. Furthermore, the embodiment does not exclude a specification where the attachment of the image file of the image of one of the pair of earphones that is left is omitted.

Further, in the above-described embodiment, the warranty service of exchanging one of the pair of earphones that is left with completely wireless earphones including the left and right earphones free of charge is assumed. However, a warranty service that charges a low fee (for example, 5 to 10% of the product price) may be employed.

A warranty service may be employed where if the master earphone (left-ear earphone El in the present embodiment) that can be connected to the music reproducing device 10a is lost, a low fee is charged for the exchange of the slave earphone (right-ear earphone Er in the present embodiment) with completely wireless earphones including the left and right earphones and where if the slave earphone is lost, the exchange of the master earphone with completely wireless earphones including the left and right earphones is conducted free of charge. Since the former is more tempting for false application, imposing charges is expected to reduce excessive false applications.

In the above embodiment, completely wireless earphones have been described as an example. However, the present invention is not limited to this and is widely applicable to products composed of a plurality of devices that can wirelessly communicate with one another when paired.

What is claimed is:

1. A terminal device comprising:
   a display unit that displays an application screen for a warranty service for a product that is provided with a plurality of devices that can wirelessly communicate with one another when paired and that is sold while the plurality of devices are paired in advance;
   an input unit that receives an entry of an identification number of the product in which any one of the plurality of devices is lost;
   a checking unit that checks whether or not conditions regarding an expiration period and the number of times of use for an exchange service for exchanging a device among the plurality of devices that is not lost with the product are satisfied based on the identification number entered into the input unit;
   a display control unit that causes the display unit to display a message with an instruction to return the device that is not lost when the conditions are satisfied; and
   an image file acquisition unit that acquires an image file of a captured image of the device among the plurality of devices that is not lost, an image file of a captured image of a document in which the date of purchase of the product is written, and an image file of a captured image of the identification number, wherein
   the checking unit determines that an application for the exchange service is valid when the conditions regarding the expiration period and the number of times of use for the exchange service are satisfied by the identification number entered into the input unit and the image file of the captured image of device among the plurality of devices that is not lost, the image file of the captured image of the document in which the date of purchase of the product is written, and the image file of the captured image of the identification number of the product have been acquired, and
   the display control unit causes the display unit to display a message with an instruction to return the device among the plurality of devices that is not lost when the application for the exchange service is determined to be valid.

2. The terminal device according to claim 1, wherein
   the plurality of devices are completely wireless earphones including a right-ear earphone and a left-ear earphone,
   one of the right-ear earphone and the left-ear earphone is connected to a music reproducing device by short-range wireless communication, and the right-ear earphone and the left-ear earphone are connected to each other by short-range wireless communication.

3. A warranty application validity checking program embedded on a non-transitory computer readable recording medium, comprising:
   a module that displays an application screen for a warranty service for a product that is provided with a plurality of devices that can wirelessly communicate with one another when paired and that is sold while the plurality of devices are paired in advance;

a module that receives an entry of an identification number of the product in which any one of the plurality of devices is lost;

a module that checks whether or not conditions regarding an expiration period and the number of times of use for an exchange service for exchanging a device among the plurality of devices that is not lost with the product are satisfied based on the identification number of the product entered into the input unit;

a module that causes the display unit to display a message with an instruction to return the device that is not lost when the conditions are satisfied; and a module that acquires an image file of a captured image of the device among the plurality of devices that is not lost, an image file of a captured image of a document in which the date of purchase of the product is written, and an image file of a captured image of the identification number, wherein the module that checks whether or not conditions are satisfied that determines that an application for the exchange service is valid when the conditions regarding the expiration period and the number of times of use for the exchange service are satisfied by the identification number entered into the input unit and the image file of the captured image of device among the plurality of devices that is not lost, the image file of the captured image of the document in which the date of purchase of the product is written, and the image file of the captured image of the identification number of the product have been acquired, and the module that causes the display unit to display a message that causes the display unit to display a message with an instruction to return the device among the plurality of devices that is not lost when the application for the exchange service is determined to be valid.

4. A terminal device comprising:

a display unit that displays an application screen for a warranty service for a product that is provided with a plurality of devices that can wirelessly communicate with one another when paired and that is sold while the plurality of devices are paired in advance;

an input unit that receives an entry of an identification number of the product in which any one of the plurality of devices is lost;

a checking unit that checks whether or not conditions regarding an expiration period and the number of times of use for an exchange service for exchanging a device among the plurality of devices that is not lost with the product are satisfied based on the identification number entered into the input unit;

a display control unit that causes the display unit to display a message with an instruction to return the device that is not lost when the conditions are satisfied;

an image file acquisition unit that acquires an image file of a captured image of the device among the plurality of devices that is not lost, an image file of a captured image of a document in which the date of purchase of the product is written, and an image file of a captured image of the identification number of the product; and an image recognition unit that analyzes the images of the acquired image files and identifies, in the images, the plurality of devices that form the product covered by the warranty, the date of purchase of the product, and the identification number of the product, wherein the checking unit determines that the application for the exchange service is valid when, for the identification number of the product entered into the input unit , the conditions regarding the expiration period and the number of times of use for the exchange service are satisfied and when the device in an image of the image files is of the same model as that of the product covered by the warranty, the date of purchase identified in an image is within the expiration period of the exchange service, and the identification number of the product identified in an image matches the identification number entered into the input unit, and the display control unit causes the display unit to display a message with an instruction to return the device among the plurality of devices that is not lost when the application for the exchange service is determined to be valid.

* * * * *